Aug. 19, 1958 A. H. MAGGS 2,848,680
ALTERNATING CURRENT DYNAMO-ELECTRIC MACHINES
Filed May 10, 1955 3 Sheets-Sheet 1

INVENTOR
ARTHUR HEMBOROUGH MAGGS
By *Miles S. Sillman*
HIS ATTORNEY

Aug. 19, 1958 A. H. MAGGS 2,848,680
ALTERNATING CURRENT DYNAMO-ELECTRIC MACHINES
Filed May 10, 1955 3 Sheets-Sheet 2

INVENTOR
ARTHUR HEMBOROUGH MAGGS
By Miles A. Pillans
HIS ATTORNEY

INVENTOR
ARTHUR HEMBOROUGH MAGGS
HIS ATTORNEY

United States Patent Office 2,848,680
Patented Aug. 19, 1958

2,848,680

ALTERNATING CURRENT DYNAMO-ELECTRIC MACHINES

Arthur Hemborough Maggs, Rugby, England, assignor to The British Thomson-Houston Company Limited, a British company Application May 10, 1955, Serial No. 507,369

Claims priority, application Great Britain May 14, 1954

2 Claims. (Cl. 322—57)

This invention relates to dynamo-electric machines, more particularly to synchronous alternating current machines of both stationary and rotating armature types and has for an object thereof, the provision of improved methods of operation, also improved circuit arrangements for synchronous alternating current generators which permit a predetermined range of output voltage regulation under varying load conditions without adversely affecting the stable operating conditions of the machine.

In synchronous alternating current machines of both stationary and rotating armature types it is well known that stability of the electromotive forces generated in the armature winding for a given ratio of field to armature ampere-turns is dependent largely on the degree of saturation of the iron parts of the magnetic circuit. In certain types of synchronous alternating current machine, more usually, but not necessarily, self-exciting, special attention is given to the iron saturation in order to secure a high degree of stability of the generated E. M. F. In such a machine of the rotating armature type, for instance, the core beneath the teeth and winding slots in the armature is designed so as to be highly saturated under all normal conditions of load, whereas the remaining iron portions of the magnetic circuit are only moderately saturated. In this type of machine a high degree of constancy of generated E. M. F. is realised over a wide range of load and power factor.

A drawback of this type of machine, however, is that the initial, or no load, E. M. F. at the rated speed cannot be adjusted, except over an extremely small range, by means of a regulating rheostat in the field circuit. Broadly speaking, the greater the stability of the generated E. M. F. achieved in a machine in which this stability is dependent principally upon magnetic saturation rather than upon a large air gap, the smaller is the range over which the no load E. M. F. can be adjusted, and vice versa. In many applications, for example, the supplying of electric motors, ability to adjust the no load E. M. F. to a precise value is of little consequence in comparison with the stability of the E. M. F., more especially at the low power factors. On the other hand, in certain applications, for example, those demanding a closely maintained voltage over a narrow range of load at constant power factor, ability to adjust the E. M. F. over a small but not negligible range may be very desirable.

Another object of the present invention is to enable the generated E. M. F. of a synchronous alternating current machine, which is designed to have an inherently stable E. M. F. characteristic, to be readily adjustable over a small range, without materially affecting adversely the stability of the E. M. F.

According to the invention we provide a synchronous alternating current machine of either stationary or rotating armature type with a slotted core (non-salient pole) field system having a distributed winding consisting of concentric coils arranged in two groups or winding portions of which the outer one having a greater pitch magnetises the whole or a greater part of each pole arc, and the inner, or smaller pitched, magnetises a limited co-axial part of each pole arc, and the excitation of the inner winding portion is made sufficient to maintain magnetic saturation of the armature teeth lying within the part of the pole arc embraced by the outermost coil of the inner group, irrespective of the excitation and M. M. F. of the outer group, under all normal conditions of armature loading, and the M. M. F. of the outer group is made adjustable over a wide range whereby to control the degree of magnetisation of the part of the pole arc embraced by the outer group but not by the inner group, and so to control the generated E. M. F. over a limited range.

In a modification the distributed field winding may consist of concentric coils arranged in three groups or winding portions of which the outer or greatest pitched, magnetises the whole or greater part of each pole arc, the innermost, centre, or smallest pitched, magnetises a limited co-axial part only of each pole arc, and the intermediate or inner winding portion magnetises a co-axial part intermediate in extent between the parts magnetised by the outer and centre winding portions and the magneto-motive force of the intermediate group which represents the inner winding portion is made sufficient to maintain magnetic saturation of the armature teeth lying within the part of the pole arc embraced by the intermediate group irrespective of the M. M. F. of the outer group, under all normal conditions of armature loading, and the magnitudes of the M. M. F.'s of the outer and centre groups are made adjustable over a wide range inversely one with respect to the other, whereby to control the degree of magnetisation of the part of the pole arc embraced by the outer group but not by the intermediate group, and so to control the generated E. M. F. over a limited range.

When the field winding is arranged in two concentric groups the outer and inner winding portions or groups of coils together with a controlling rheostat may be connected in a variety of ways in relation to each other and to the source of direct current. A simple and effective arrangement is one in which the inner group or winding portion is connected directly to the direct current source, and the outer is connected in series with the rheostat, the combination being connected to the direct current source. Thus the current in the inner group is not affected by variation of the rheostat. Alternatively the outer group may be connected across one section of a potentiometer connected rheostat which is connected to the direct current source. This arrangement enables the current in the outer group to be varied over a range from a maximum to zero. Again the outer and inner groups may be connected in series and a rheostat connected in shunt with the outer group. This arrangement causes the current in the inner group to vary in the inverse sense with respect to that in the outer as the rheostat setting is varied, and thus enables the losses and temperature rise of the field system as a whole to be kept more constant over the range of adjustment without adversely affecting the desired stable E. M. F. characteristic.

When the field winding is arranged in three concentric groups the losses and temperature rise of the field system can be held even more constant than is possible with two groups, by connecting the outer and centre groups in series, the junction of these two being connected to the adjustable tap of a potentiometer connected rheostat in parallel with the two groups, and by connecting the intermediate group in parallel with the outer and inner groups. Thus the current in the intermediate group, that is the inner winding portion is not affected by adjustment of the rheostat, whereas the currents in the outer and centre groups vary inversely with respect to each other with adjustment of the rheostat. Alternatively the three groups could be arranged all in series, the outer and centre groups being adjacent with the potentiometer rheostat connected in parallel with them, but this arrangement yields less desirable characteristics than the parallel one described before.

The invention will now be described with reference to the accompanying drawings, in which.

Figure 5:
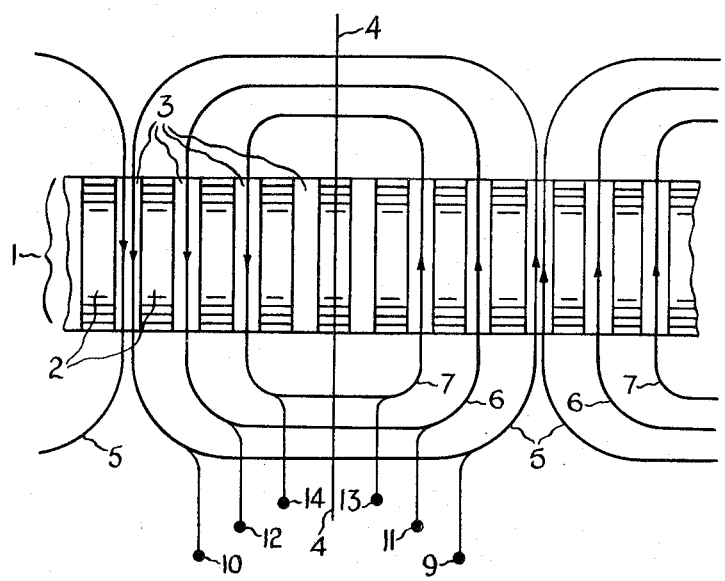
Fig. 5 is a developed plan similar to Fig. 1 but having the coils of the winding arranged in three groups and Fig. 6 is a connection diagram illustrating a preferred method of connecting the three groups of coils shown in Fig. 5.

Figs. 7(a), (b) and (c) are diagrammatic representations of the magneto-motive force and the flux density along the periphery of the field system resulting from the winding shown in Fig. 5.

Figure 8:
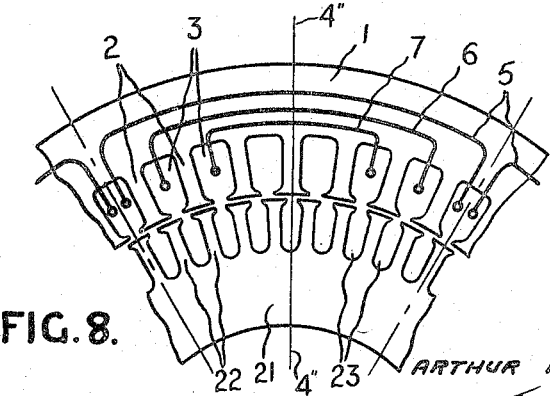

Fig. 8 is a part end view of a rotating armature machine embodying the arrangement of field winding shown in Fig. 5.

In all the figures, corresponding parts are indicated by the same reference number.

Figure 1:
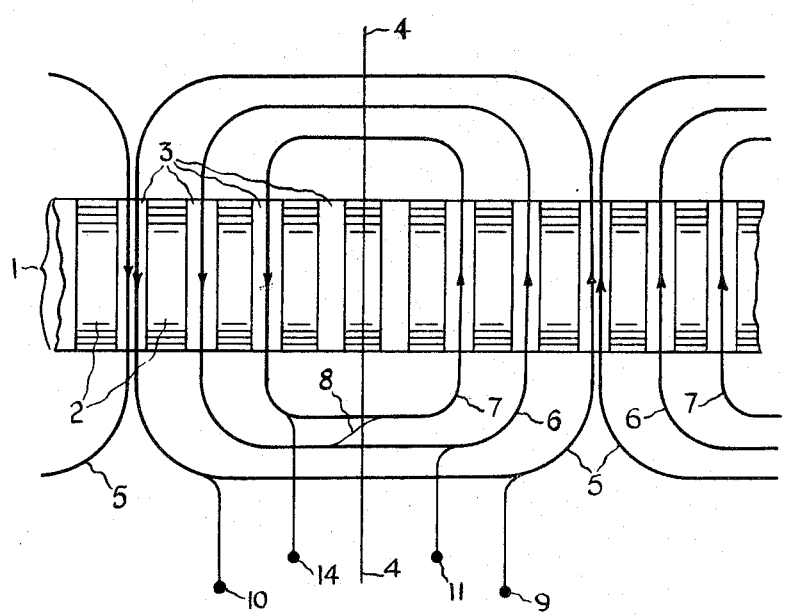
Fig. 1 is a developed diagrammatic plan of part of the field system and winding of a synchronous alternating current machine according to the invention and having the coils of the winding arranged in two winding portions or groups. The field system may be either rotating or stationary.

Referring first to Fig. 1, in which one complete pole winding arrangement consisting of three co-axial coils is shown together with a half of an adjacent pole, 1 represents the ferromagnetic core whose periphery adjacent to the armature (not shown) consists of teeth 2 defining between them slots 3 in some or all of which the coils of the pole winding are placed. The three coils of the complete pole shown are symmetrical with respect to a plane indicated by the line 4—4, and consist of an outer winding portion or coil group formed by a single coil 5 and an inner winding portion comprising a group of two coils 6 and 7 which are connected in series by the link 8. The corresponding coils of the adjacent pole are indicated by corresponding figures and whenever reference is made to a particular group of coils the corresponding coils of all poles of the winding are included. The direction of current flow as indicated by the arrowheads, is reversed for adjacent poles in order to produce alternate N and S poles around the periphery of the core. The various poles may be connected in series, parallel or series-parallel in known manner as convenient, and pole to pole connections are not shown for simplicity. The incoming and outgoing terminals of the outer winding portion or coil group are represented by 9 and 10 respectively and those for the inner winding portion or coil group by 11 and 14 respectively, and these four terminals are regarded as terminals for the whole winding.

Figure 2:
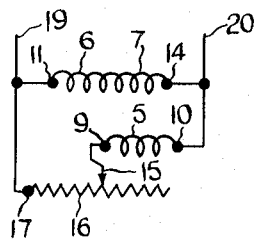
Figs. 2, 3 and 4 are connection diagrams illustrating three methods of connecting the two groups of coils shown in Fig. 1.

In Fig. 2, 5 represents the outer group of coils and 6, 7 the inner group. The terminals 10 and 14 of the outer and inner groups respectively are connected to the pole 20 of a direct current source, the terminal 11 of the inner group is connected to the pole 19 of the direct current source, and the terminal 9 of the outer group is connected via an adjustable regulating contact 15 of a rheostat 16, having its terminal 17 connected to the pole 19.

Figure 3:
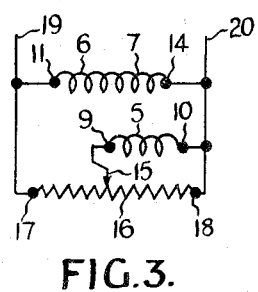

Fig. 3 is identical with Fig. 2 except that the rheostat 16 is connected in potentiometer fashion, having an additional terminal 18 connected to the pole 20 of the direct current source. Thus the current in group 5 can be reduced to zero.

Figure 4:
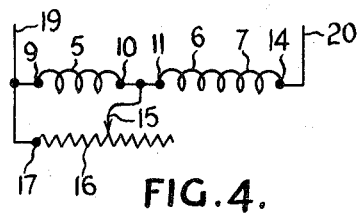

In Fig. 4 the outer group 5 and inner group 6, 7 are connected in series, terminals 10 and 11 being joined together, terminals 9 and 14 are connected to poles 19 and 20 of the direct current source, contact 15 of the rheostat is connected to the junction between 10 and 11, and terminal 17 of the rheostat is connected to terminal 9, whereby the rheostat 16 shunts the outer group 5.

Fig. 5 is generally similar to Fig. 1, except that the three coils of each pole each constitute a separate group with its own terminals, thus 5 represents the outer group with incoming and outgoing terminals 9 and 10 respectively, 6 represents the intermediate or inner group with terminals 11 and 12, and 7 represents the innermost or centre group with terminals 13 and 14.

Figure 6:
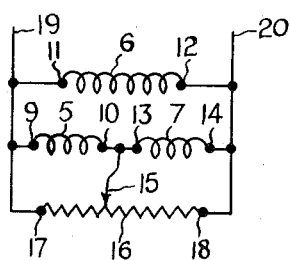

In Fig. 6 the intermediate or inner group 6 is connected through its terminals 11 and 12 directly to the poles 19 and 20 respectively of the direct current source, the outer group 5 and innermost or centre group 7 are connected in series, terminals 10 and 13 being joined together, terminal 9 is connected to pole 19, terminal 14 to pole 20, and movable contact 15 of the rheostat 16 is connected to the junction of 10 and 13. Terminals 17 and 18 are supplied from poles 19 and 20 of the source. Thus, while the current in group 6 is independent of the setting of 15, the currents in the outer and centre groups 5, 7 are made to vary inversely one with respect to the other as 15 is moved, the current in 5 being zero and that in 7 a maximum when 15 coincides with 17, and a maximum and zero respectively when 15 coincides with 18.

Figure 7:
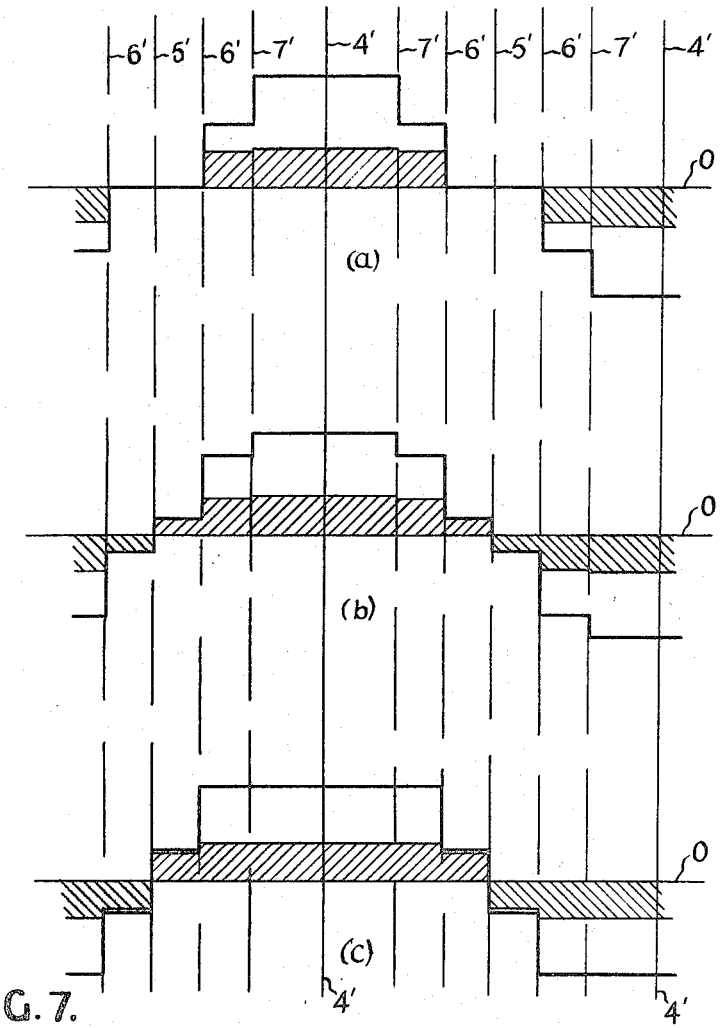

Referring now to Fig. 7, the ordinate of the stepped graph above or below the datum line O, at any point along it represents the sum of the M. M. F.'s of the three groups of coils shown in Figs. 5 and 6. The M. M. F. of any coil outside the portion of the core which it embraces is zero. The height of the shaded figure represents the proportion of the M. M. F. expended in the air gap between the field system and the armature, and the difference between the two graphs represents the proportion expended in the armature teeth and indicates the degree of magnetic saturation of the teeth. The height of the shaded figure also represents the flux density in the air gap and the area of each shaded figure represents the integrated magnetic flux per pole. The line 4'—4' represents the centre line of the pole arc with respect to which the coils of the complete pole shown are symmetrical, and 5', 6' and 7' represent the positions of the sides of the outer, intermediate or inner, and centre coils respectively. 5' is also the dividing line between adjacent poles. In Fig. 7 (a) represents the condition when contact 15 of the rheostat is at 17, that is when the outer group carries no current and thus produces no M. M. F. There is then no flux in the field teeth lying between the outer and intermediate groups, and the shaded area is a minimum. (c) represents the condition when contact 15 is at 18, that is when the outer group 5 carries maximum current and produces maximum flux in the field teeth lying between the outer and intermediate groups, and when the innermost or centre group 7 carrying no current produces no M. M. F. additional to that of the outer and intermediate groups, and thus the shaded area is a maximum; (b) represents the condition when contact 15 is about half-way between 17 and 18 that is when the flux in the field teeth lying between the outer and intermediate groups is about half the maximum value.

In Fig. 8 which shows one pole of a rotating armature machine, the field coils 5, 6 and 7 coaxial with the line 4"—4" correspond with those of Fig. 5, 1 represents the field core, 2 the teeth and 3 the slots as in Fig. 5. 21 represents the armature core, 22 the armature teeth and 23 the slots which are occupied by the armature winding, not shown for the sake of simplicity.

The invention may be embodied in an alternator of any otherwise conventional construction and for any purpose, but it is most suitable to be incorporated in small alternators designed to have a close inherent voltage regulation and to be self-exciting. Examples of self-exciting alternators are the well-known type of rotating armature machine having a commutated winding on the armature in addition to the main winding, the exciting current being taken from the commutator, and the type with either stationary or rotating armature which utilises a rectifier to obtain the exciting current from the armature winding.

What I claim is:

1. A synchronous dynamo-electric machine comprising in combination, a wound field system which carries in core slots for each pole three concentric field windings, the ends of said windings being connected to external terminals and the spans of the windings differing from each other, said field system further having the winding of intermediate span of the said three windings excited to cause under all normal armature loads magnetic saturation in those teeth of the armature which are embraced by said winding while the outer and inner windings which have greater and lesser spans are connected to means for regulating their excitation in opposite senses.

2. A dynamo-electric machine as claimed in claim 1, wherein the outer and inner windings form a series circuit and have their junction point connected to the movable contact of a potentiometer, the potentiometer and the intermediate winding forming shunt circuits to the said series circuit of the outer and inner windings.

References Cited in the file of this patent
UNITED STATES PATENTS

| | | |
|---|---|---|
| 608,309 | Steinmetz | Aug. 2, 1898 |
| 1,685,970 | Townend et al. | Oct. 2, 1928 |
| 2,227,467 | Sweeny | Jan. 7, 1941 |

FOREIGN PATENTS

| | | |
|---|---|---|
| 785,103 | France | May 13, 1935 |
| 902,401 | Germany | Jan. 21, 1954 |